US008209928B2

(12) United States Patent
Garcia et al.

(10) Patent No.: US 8,209,928 B2
(45) Date of Patent: Jul. 3, 2012

(54) EMBOSSED-IN-REGISTRATION FLOORING SYSTEM

(75) Inventors: Eugenio Cruz Garcia, Cuenca (ES); Vicente Sabater, Valencia (ES)

(73) Assignee: Faus Group, Dalton, GA (US)

( * ) Notice: Subject to any disclaimer, the term of this patent is extended or adjusted under 35 U.S.C. 154(b) by 0 days.

(21) Appl. No.: 10/352,189

(22) Filed: Jan. 28, 2003

(65) Prior Publication Data
US 2003/0167717 A1 Sep. 11, 2003

Related U.S. Application Data

(63) Continuation-in-part of application No. 10/137,319, filed on May 3, 2002, now Pat. No. 6,691,480.

(51) Int. Cl.
*B44F 7/00* (2006.01)
(52) U.S. Cl. ............................... 52/316; 52/390; 52/313
(58) Field of Classification Search .................. 52/539, 52/311, 390, 392, 541, 282.1, 591.1, 591.2, 52/313; 428/537.1, 47, 50, 203, 105, 67, 428/159
See application file for complete search history.

(56) References Cited

U.S. PATENT DOCUMENTS

| | | | |
|---|---|---|---|
| D16,458 S | 1/1886 | Mankey | |
| 669,445 A | 3/1901 | Morey | |
| 800,655 A | 10/1905 | Kitsee | |
| 1,479,647 A | 1/1924 | Carroll | |
| RE16,473 E | 11/1926 | Humphreys | |
| 1,697,426 A | 1/1929 | Humphreys | |
| 1,825,877 A | 10/1931 | Loetscher | |
| 1,854,933 A | 4/1932 | Hartman et al. | |
| 1,869,864 A | 8/1932 | Phillips | |
| 1,996,834 A | 4/1935 | Schleicher | |
| 1,998,526 A | 4/1935 | Schubert | |
| 2,027,292 A | 1/1936 | Rockwell | |
| 2,037,465 A | 4/1936 | Gibson at al. | |
| 2,046,593 A | 7/1936 | Urbain | |
| 2,054,458 A | 9/1936 | Arge et al. | |
| 2,057,135 A | 10/1936 | Cherry | |
| 2,063,935 A | 12/1936 | Kirschbraun | |
| 2,108,226 A * | 2/1938 | Johnston | 404/42 |
| 2,137,238 A | 11/1938 | Collins | |
| 2,246,377 A | 6/1941 | Mattes | |
| 2,311,156 A | 2/1943 | Casto | |
| 2,491,498 A | 12/1949 | Gustaf | |
| 2,619,681 A | 12/1952 | Baker et al. | |

(Continued)

FOREIGN PATENT DOCUMENTS
AU 33432 8/1979
(Continued)

OTHER PUBLICATIONS

International Search Report mailed Mar. 14, 2005, corresponding to International Application No. PCT/IB2004/000884.

(Continued)

*Primary Examiner* — Basil Katcheves
(74) *Attorney, Agent, or Firm* — Vedder Price P.C.

(57) ABSTRACT

Laminated flooring panels include decorative motifs, mechanically embossed-in-registration surface textures, recessed perimeters, and locking mechanisms. The locking mechanisms facilitate the alignment of adjacent flooring panels. Adjacent flooring panels substantially aligned allow embossed-in-registration patterns to be substantially continuous across adjacent flooring panels. The recessed perimeter prevents the edges of the flooring panel from prematurely wearing.

25 Claims, 11 Drawing Sheets

U.S. PATENT DOCUMENTS

| | | | |
|---|---|---|---|
| 2,715,289 A | 8/1955 | Gale | |
| 3,002,309 A | 10/1961 | Snyder | |
| 3,025,626 A | 3/1962 | Schumacher | |
| 3,204,380 A | 9/1965 | Smith et al. | |
| 3,293,108 A * | 12/1966 | Nairn et al. | 428/159 |
| 3,345,234 A | 10/1967 | Jecker et al. | |
| 3,373,068 A | 3/1968 | Grosheim et al. | |
| 3,387,422 A | 6/1968 | Wanzer | |
| 3,414,194 A | 12/1968 | Seitzinger | |
| 3,421,277 A | 1/1969 | Frischmuth | |
| 3,459,400 A | 8/1969 | Rothermel | |
| 3,515,620 A | 6/1970 | Mcpherson | |
| 3,551,177 A | 12/1970 | Hechtman et al. | |
| 3,592,474 A | 7/1971 | O'Neil | |
| 3,627,861 A | 12/1971 | Timke | |
| 3,648,358 A | 3/1972 | Cannady et al. | |
| 3,654,044 A | 4/1972 | Hirota | |
| 3,698,978 A | 10/1972 | McQuade | |
| 3,732,137 A | 5/1973 | Scher | |
| 3,740,914 A | 6/1973 | Amaiz Diez | |
| 3,740,915 A | 6/1973 | Mollman | |
| 3,802,947 A | 4/1974 | McQuade, Jr. | |
| 3,808,024 A | 4/1974 | Witman | |
| 3,810,774 A | 5/1974 | Pittman | |
| 3,814,647 A | 6/1974 | Scher et al. | |
| 3,846,219 A | 11/1974 | Kunz | |
| 3,857,915 A | 12/1974 | Crowley | |
| 3,875,716 A | 4/1975 | Eusemann | |
| 3,878,030 A | 4/1975 | Cook | |
| 3,880,687 A | 4/1975 | Elmendorf et al. | |
| 3,912,569 A | 10/1975 | Kapral | |
| 3,997,696 A | 12/1976 | Jaisle et al. | |
| 4,062,992 A | 12/1977 | Power et al. | |
| 4,092,198 A | 5/1978 | Scher et al. | |
| 4,092,199 A | 5/1978 | Ungar et al. | |
| 4,093,766 A | 6/1978 | Scher et al. | |
| 4,114,877 A | 9/1978 | Goldfarb et al. | |
| 4,118,533 A | 10/1978 | Hipchen et al. | |
| 4,125,263 A | 11/1978 | Hamilton | |
| 4,126,727 A | 11/1978 | Kaminski | |
| 4,131,705 A | 12/1978 | Kubinsky | |
| 4,143,496 A | 3/1979 | Destito | |
| 4,154,882 A | 5/1979 | Ungar et al. | |
| 4,163,818 A | 8/1979 | Wernli | |
| 4,177,305 A | 12/1979 | Feingold et al. | |
| 4,210,693 A | 7/1980 | McCann et al. | |
| 4,239,797 A | 12/1980 | Sachs | |
| 4,241,554 A | 12/1980 | Infantino | |
| 4,243,367 A | 1/1981 | Renoux | |
| 4,248,922 A | 2/1981 | Shortway et al. | |
| 4,284,453 A | 8/1981 | Endrizzi | |
| 4,290,248 A | 9/1981 | Kemerer et al. | |
| 4,299,069 A | 11/1981 | Neumann | |
| 4,367,110 A | 1/1983 | Yoshikawa | |
| 4,374,886 A | 2/1983 | Raghava | |
| 4,376,812 A * | 3/1983 | West | 428/165 |
| 4,396,448 A * | 8/1983 | Ohta et al. | 156/219 |
| 4,409,280 A | 10/1983 | Wiley et al. | |
| 4,420,351 A | 12/1983 | Lussi et al. | |
| D273,527 S | 4/1984 | Pota | |
| 4,490,503 A | 12/1984 | Goring | |
| 4,500,373 A * | 2/1985 | Kubota | 156/79 |
| 4,517,236 A | 5/1985 | Meeker et al. | |
| 4,546,025 A | 10/1985 | Vaisman | |
| 4,557,779 A * | 12/1985 | Bower et al. | 156/219 |
| 4,568,082 A | 2/1986 | Musolino | |
| 4,571,353 A | 2/1986 | Gable, Jr. | |
| 4,579,767 A | 4/1986 | Coggan et al. | |
| 4,581,255 A | 4/1986 | Coggan et al. | |
| 4,585,685 A | 4/1986 | Forry et al. | |
| 4,599,127 A * | 7/1986 | Cannady et al. | 156/289 |
| 4,625,491 A | 12/1986 | Gibson | |
| 4,676,510 A | 6/1987 | Agam | |
| 4,689,102 A | 8/1987 | Prawdzik et al. | |
| 4,693,924 A | 9/1987 | Kuper et al. | |
| 4,702,870 A | 10/1987 | Setterholm | |
| 4,791,015 A | 12/1988 | Becker et al. | |
| 4,816,319 A | 3/1989 | Dees, Jr. et al. | |
| 4,844,849 A | 7/1989 | Miller et al. | |
| 4,860,506 A * | 8/1989 | Yoshimi et al. | 52/144 |
| 4,864,790 A * | 9/1989 | Liardet | 52/311.2 |
| 4,912,850 A | 4/1990 | Gray | |
| 4,940,503 A | 7/1990 | Lindgren et al. | |
| 4,950,500 A | 8/1990 | Kauffman et al. | |
| 4,953,786 A | 9/1990 | Arsenault | |
| 5,011,411 A | 4/1991 | Loewy et al. | |
| 5,034,272 A | 7/1991 | Lindgren et al. | |
| 5,053,274 A | 10/1991 | Jonas | |
| 5,112,671 A | 5/1992 | Diamond et al. | |
| 5,113,632 A | 5/1992 | Hanson | |
| 5,136,823 A * | 8/1992 | Pellegrino | 52/539 |
| 5,167,991 A | 12/1992 | Lowe | |
| 5,226,273 A * | 7/1993 | Burke | 52/390 |
| 5,234,340 A | 8/1993 | Hambright | |
| 5,283,102 A | 2/1994 | Sweet et al. | |
| 5,295,341 A | 3/1994 | Kajiwara | |
| 5,304,272 A | 4/1994 | Rohrbacker et al. | |
| 5,314,554 A | 5/1994 | Owens | |
| 5,335,473 A * | 8/1994 | Chase | 52/745.08 |
| 5,391,340 A | 2/1995 | Mirous et al. | |
| 5,413,834 A | 5/1995 | Hunter et al. | |
| 5,425,986 A | 6/1995 | Guyette | |
| 5,437,934 A * | 8/1995 | Witt et al. | 428/537.1 |
| 5,468,323 A | 11/1995 | McNeil | |
| 5,487,217 A | 1/1996 | Richardson et al. | |
| 5,496,129 A | 3/1996 | Dube | |
| 5,525,394 A * | 6/1996 | Clarke et al. | 428/105 |
| 5,554,429 A | 9/1996 | Iwata et al. | |
| 5,558,933 A | 9/1996 | Anthony | |
| 5,570,554 A * | 11/1996 | Searer | 52/539 |
| 5,587,218 A * | 12/1996 | Betz | 428/67 |
| 5,637,236 A | 6/1997 | Lowe | |
| 5,681,428 A * | 10/1997 | Nakajima et al. | 162/117 |
| 5,692,749 A | 12/1997 | Vogeler | |
| 5,713,173 A * | 2/1998 | Von Langsdorff et al. | 52/311.2 |
| 5,723,221 A * | 3/1998 | Brooker et al. | 428/469 |
| 5,736,227 A * | 4/1998 | Sweet et al. | 428/192 |
| 5,744,220 A | 4/1998 | Ringö | |
| 5,755,068 A | 5/1998 | Ormiston | |
| 5,766,752 A | 6/1998 | Cox et al. | |
| 5,774,236 A | 6/1998 | Blazey | |
| 5,815,995 A | 10/1998 | Adam | |
| 5,830,529 A | 11/1998 | Ross | |
| 5,853,637 A | 12/1998 | Bryant | |
| 5,858,160 A * | 1/1999 | Piacente et al. | 156/279 |
| 5,862,643 A | 1/1999 | Schilham | |
| 5,884,445 A | 3/1999 | Woolfard | |
| 5,894,700 A | 4/1999 | Sweet | |
| 5,961,903 A | 10/1999 | Eby et al. | |
| 5,985,397 A * | 11/1999 | Witt et al. | 428/44 |
| 5,992,106 A * | 11/1999 | Carling et al. | 52/177 |
| 6,032,425 A | 3/2000 | Gugliotti et al. | |
| 6,099,782 A | 8/2000 | Holmes | |
| 6,101,778 A | 8/2000 | Martensson | |
| 6,103,352 A | 8/2000 | Takahashi | |
| 6,114,008 A | 9/2000 | Eby et al. | |
| 6,131,355 A | 10/2000 | Groh et al. | |
| 6,134,854 A | 10/2000 | Stanchfield | |
| 6,146,252 A | 11/2000 | Mårtensson | |
| 6,156,402 A * | 12/2000 | Smith | 428/40.1 |
| 6,182,410 B1 | 2/2001 | Pervan | |
| 6,182,413 B1 | 2/2001 | Magnusson | |
| 6,189,283 B1 | 2/2001 | Bentley et al. | |
| 6,203,879 B1 | 3/2001 | Desai | |
| 6,224,698 B1 * | 5/2001 | Endo | 156/60 |
| 6,247,285 B1 | 6/2001 | Moebus | |
| 6,300,279 B1 | 10/2001 | Macedo | |
| 6,375,777 B1 | 4/2002 | Sjölin et al. | |
| 6,397,544 B1 | 6/2002 | Desai | |
| 6,401,415 B1 * | 6/2002 | Garcia | 52/311.1 |
| 6,418,683 B1 | 7/2002 | Martensson et al. | |
| 6,421,970 B1 * | 7/2002 | Martensson et al. | 52/282.1 |
| 6,449,913 B1 * | 9/2002 | Shelton | 52/390 |
| 6,460,306 B1 | 10/2002 | Nelson | |
| 6,465,046 B1 | 10/2002 | Hansson et al. | |
| 6,494,982 B1 | 12/2002 | Mueller et al. | |
| 6,519,912 B1 * | 2/2003 | Eckmann et al. | 52/730.7 |

| | | |
|---|---|---|
| 6,536,178 B1 | 3/2003 | Palsson et al. |
| 6,551,678 B1 | 4/2003 | O'Brien et al. |
| 6,558,754 B1 | 5/2003 | Velin et al. |
| 6,565,919 B1 | 5/2003 | Hansson et al. |
| 6,588,163 B2 | 7/2003 | Wang et al. |
| 6,609,348 B2 | 8/2003 | Desai |
| 6,617,009 B1 | 9/2003 | Chen et al. |
| 6,627,029 B1 | 9/2003 | Mueller et al. |
| 6,638,387 B2 | 10/2003 | Cruz |
| 6,688,061 B2 * | 2/2004 | Garcia .................. 52/311.1 |
| 6,691,480 B2 * | 2/2004 | Garcia .................. 52/313 |
| 6,709,764 B1 | 3/2004 | Perrin |
| 6,786,019 B2 | 9/2004 | Thiers |
| 6,790,042 B2 | 9/2004 | Worth |
| 6,803,110 B2 | 10/2004 | Drees et al. |
| 6,874,292 B2 | 4/2005 | Moriau et al. |
| 6,880,307 B2 | 4/2005 | Schwitte et al. |
| 6,884,493 B2 | 4/2005 | Magee et al. |
| 6,918,220 B2 | 7/2005 | Pervan |
| 6,925,764 B2 | 8/2005 | Hrovath et al. |
| 6,966,161 B2 | 11/2005 | Palsson et al. |
| 7,055,290 B2 | 6/2006 | Thiers et al. |
| 7,070,846 B2 | 7/2006 | Beistline et al. |
| 7,083,841 B2 | 8/2006 | Oakey et al. |
| 7,243,469 B2 | 7/2007 | Miller et al. |
| 7,249,445 B2 | 7/2007 | Theirs |
| 7,716,896 B2 | 5/2010 | Pervan |
| 7,836,648 B2 | 11/2010 | Garcia et al. |
| 2001/0034992 A1 | 11/2001 | Pletzer et al. |
| 2002/0014047 A1 | 2/2002 | Thiers |
| 2002/0046526 A1 | 4/2002 | Knauseder |
| 2002/0046527 A1 | 4/2002 | Nelson |
| 2002/0046528 A1 | 4/2002 | Pervan et al. |
| 2002/0046542 A1 | 4/2002 | Tychsen |
| 2002/0056245 A1 | 5/2002 | Thiers |
| 2002/0059765 A1 | 5/2002 | Nogueira et al. |
| 2002/0100231 A1 | 8/2002 | Miller et al. |
| 2002/0100242 A1 | 8/2002 | Olofsson |
| 2002/0110669 A1 | 8/2002 | Garcia |
| 2002/0160680 A1 | 10/2002 | Laurence et al. |
| 2002/0189183 A1 | 12/2002 | Ricciardelli et al. |
| 2003/0108717 A1 | 6/2003 | Sjoberg et al. |
| 2003/0205012 A1 | 11/2003 | Garcia |
| 2003/0205316 A1 | 11/2003 | Kai |
| 2003/0208980 A1 | 11/2003 | Miller et al. |
| 2004/0074191 A1 | 4/2004 | Garcia |
| 2005/0079323 A1 | 4/2005 | Miller et al. |
| 2006/0032168 A1 | 2/2006 | Thiers et al. |
| 2006/0191222 A1 | 8/2006 | Sabater et al. |
| 2007/0298209 A1 | 12/2007 | Kohlman et al. |
| 2008/0193698 A1 | 8/2008 | Oakey et al. |

FOREIGN PATENT DOCUMENTS

| | | |
|---|---|---|
| AU | 519917 | 1/1982 |
| CH | 645301 | 9/1994 |
| CN | 2122896 | 11/1992 |
| CN | 1068775 | 2/1993 |
| CN | 2144677 | 10/1993 |
| CN | 1086282 | 5/1994 |
| CN | 1093657 | 10/1994 |
| CN | 2178751 | 10/1994 |
| CN | 1111316 | 11/1995 |
| CN | 1124814 | 6/1996 |
| CN | 1139143 | 1/1997 |
| CN | 1140646 | 1/1997 |
| CN | 1161013 | 10/1997 |
| CN | 2276875 | 3/1998 |
| CN | 2312287 | 3/1999 |
| CN | 2323056 | 6/1999 |
| CN | 1223931 | 7/1999 |
| CN | 1240167 | 1/2000 |
| CN | 1256200 | 6/2000 |
| CN | 1278484 | 1/2001 |
| CN | 1282654 | 2/2001 |
| CN | 1285449 | 2/2001 |
| CN | 2428285 | 5/2001 |
| CN | 1376230 | 10/2002 |
| CN | 1426880 | 7/2003 |
| DE | 2111772 | 9/1971 |
| DE | 02239352 | 2/1974 |
| DE | 2657809 | 6/1978 |
| DE | 2752864 | 5/1979 |
| DE | 30 07 979 A1 | 10/1981 |
| DE | 3219508 | 12/1983 |
| DE | 3328528 | 6/1985 |
| DE | 3634764 | 4/1988 |
| DE | 19610669 | 3/1997 |
| DE | 197 22 339 A1 | 12/1998 |
| DE | 199 01 377 A | 7/2000 |
| DE | 200 08 837 U1 | 8/2000 |
| DE | 20100320 | 4/2001 |
| DE | 20300412 | 3/2003 |
| DE | 10204154 | 8/2003 |
| DE | 20311569 | 10/2003 |
| DE | 20313350 | 12/2003 |
| EP | 0461758 | 12/1991 |
| EP | 0 592 573 B1 | 9/1996 |
| EP | 0592573 | 9/1996 |
| EP | 0788576 | 8/1997 |
| EP | 0 813 641 B1 | 7/2001 |
| EP | 0 888 215 B1 | 6/2002 |
| EP | 1 225 033 A1 | 7/2002 |
| EP | 1229183 | 8/2002 |
| EP | 0 883 487 B1 | 10/2002 |
| EP | 1 153 736 B1 | 11/2004 |
| ES | 163421 U | 5/1971 |
| ES | 460194 A | 5/1978 |
| ES | 283331 U | 5/1985 |
| ES | 1019585 U | 4/1992 |
| FR | 571542 | 5/1924 |
| FR | 976356 | 3/1951 |
| FR | 1 489 710 | 7/1967 |
| FR | 2 409 867 | 6/1979 |
| FR | 2 530 274 | 1/1984 |
| FR | 2 536 337 | 5/1984 |
| GB | 2 145 421 | 3/1965 |
| GB | 1202324 | 8/1970 |
| GB | 1 215 971 | 12/1970 |
| GB | 1 262 850 | 2/1972 |
| GB | 2 054 458 | 2/1981 |
| GB | 1 590 540 | 6/1981 |
| GB | 2 088 280 | 6/1982 |
| GB | 2 191 953 | 12/1987 |
| GB | 2 345 369 A | 7/2000 |
| JP | 55-100154 | 7/1980 |
| JP | 63-040055 | 2/1988 |
| JP | 01-010847 | 1/1989 |
| JP | H11989-087315 | 3/1989 |
| JP | 2-143846 | 6/1990 |
| JP | 2143846 | 6/1990 |
| JP | H31991-028257 | 2/1991 |
| JP | 6-010482 | 1/1994 |
| JP | 6-508897 | 10/1994 |
| JP | 7-88992 | 4/1995 |
| JP | 7-266305 | 10/1995 |
| JP | 9-011259 | 1/1997 |
| JP | H-10-183964 | 7/1998 |
| JP | 2000-265652 | 9/2000 |
| JP | 2004-84285 | 3/2004 |
| JP | 2004-225456 | 8/2004 |
| JP | 2005-503502 | 2/2005 |
| JP | 2005-523394 | 8/2005 |
| KR | 10-0430315 | 5/1999 |
| RU | 2077640 | 4/1997 |
| RU | 2123094 | 12/1998 |
| SU | 1271955 | 11/1986 |
| SU | 1716040 | 2/1992 |
| WO | WO 79/00629 | 9/1979 |
| WO | WO 91/06427 | 5/1991 |
| WO | WO 94/26999 | 11/1994 |
| WO | WO 97/19232 | 5/1997 |
| WO | 97/31776 A1 | 9/1997 |
| WO | WO 97/31775 | 9/1997 |
| WO | WO 97/47834 | 12/1997 |
| WO | WO 01/33011 | 5/2001 |
| WO | WO 01/48333 A1 | 7/2001 |
| WO | WO 01/96689 A1 | 12/2001 |
| WO | WO 02/055809 | 7/2002 |

| WO | WO 02/058924 | | 8/2002 |
| --- | --- | --- | --- |
| WO | WO 03/006232 | | 1/2003 |
| WO | WO 03/006323 | A | 1/2003 |
| WO | WO 03/047858 | | 6/2003 |
| WO | WO 03/078761 | A1 | 9/2003 |

OTHER PUBLICATIONS

*Faus Group Inc. and Industrias Auxiliares Faus, S.L. v. Berry Floor N.V., Berry Finance N.V., Alloc Inc., and Beaulieu International Group N.V.*, 1:08-cv-00315-TWT, Defendants' Opening Claim Construction Brief filed in N.D. Ga. on Dec. 11, 2008, pp. 1-45, Exhibits 1-5.

*Faus Group Inc. and Industrias Auxiliares Faus, S.L. v. Berry Floor N.V., Berry Finance N.V., Alloc Inc., and Beaulieu International Group N.V.*, 1:08-cv-00315-TWT, Declaration of Matthew T. Bailey in Support of Plaintiffs Faus Group, Inc. and Industries Auxiliares Faus S.L.'s Memorandum in Support of their Proposed Claim Constructions, filed in N.D. Ga. Dec. 11, 2008, pp. 1-9, Exhibits 1-14.

*Faus Group Inc. and Industrias Auxiliares Faus, S.L. v. Berry Floor N.V., Berry Finance N.V., Alloc Inc., and Beaulieu International Group N.V.*, 1:08-cv-00315-TWT, Memorandum in Support of their Proposed Claim Constructions filed in N.D. Ga. Dec. 11, 2008, pp. 1-47.

Letter from Paul Oakley to Tarkett Distributor Sales Representatives; "Ceramique Tile Introduction", Jul. 29, 1999, one page.

Letter from Paul Oakley to Tarkett Distributor Sales Representatives; "Ceramique Tile Introduction", Jul. 29, 1999, three pages.

"Surface Decoration of Artificial Board".

"Resin Impregnated Paper for Overlaying".

"The Practical Manual for Intensified Wood Floor Board".

\* cited by examiner

EMBOSSED-IN-REGISTRATION FLOORING SYSTEM

This application is a Continuation-in-Part of application, Ser. No. 10/137,319, filed on May 3, 2002, now U.S. Pat. No. 6,691,480 entitled "EMBOSSED-IN-REGISTER PANEL SYSTEM" and incorporates by reference application, Ser. No. 09/903,807, filed on Jul. 31, 2001, entitled "EMBOSSED-IN-REGISTER MANUFACTURING PROCESS" and U.S. Pat. No. 6,401,415, filed on Dec. 13, 1999, entitled "DIRECT LAMINATED FLOOR", for all purposes as if fully set forth herein.

BACKGROUND OF THE INVENTION

1. Field of the Invention

The present invention relates to laminated materials. More particularly, the present invention relates to a flooring system of interlocked laminated materials having decorative motifs and surface textures that are mechanically embossed in registration with their decorative motifs.

2. Discussion of the Related Art

Because of their look and feel, traditional building and finishing flooring materials such as fine woods, slate, granite, stones, brick, and concrete are generally preferred by consumers. However, such traditional building and finishing flooring materials tend to be expensive to produce and install. For example, while a solid wood floor has a highly valued luxurious appearance, the materials and labor required to install such floors can be prohibitively expensive.

Many alternatives to traditional building and finishing flooring materials, including laminates and high-pressure laminate boards (HPL), are available. However, such alternatives typically do not possess the realistic look and texture of the traditional building and finishing flooring materials. For example, most alternatives having an outer surface with a wood motif look fake and can readily be identified as something other than authentic wood. Furthermore, while high quality HPL boards may visually look like wood, their textures readily reveal that they are not.

One problem with most alternatives to traditional building and finishing flooring materials is that their surface textures do not match their decorative motifs. For example, visual depictions of wood knots in alternative flooring materials are not matched with surface textures characteristic of the wood knots. Accordingly, the attractiveness of these alternative materials is significantly reduced.

One approach used to match the surface texture of alternative flooring materials to their decorative motifs includes a technique known as chemical embossing. In chemical embossing, the surface texture of the alternative material is developed by chemically reacting an ink that forms the decorative motif with an agent added to a sub-surface layer. While somewhat successful, the resulting surface texture tends to lack the textual sharpness and three-dimensional characteristics of traditional materials.

As an alternative to the traditional building and finishing flooring materials laminated materials may be mechanically embossed to produce a surface texture. See, for example U.S. patent application Ser. No. 09/903,807 and U.S. Pat. No. 6,401,415, which are hereby incorporated by reference. Such methods produce embossed-in-registration laminated materials having decorative motifs and matching high-quality three-dimensional textures. Embossed-in-registration laminated materials require accurate registration of mechanical embossment and the decorative motif. An advantage of embossed-in-registration laminated materials is that they can realistically reproduce the look and feel of traditional products.

No matter what type of flooring system is used, the flooring system must be easily moved to a work site while being easy and quick to install. To this end, assembly and locking mechanisms may be incorporated within flooring systems to facilitate on-site installation. One type of assembly and locking mechanism is the tongue and groove system used for connecting panels. It is understood that such tongue and groove systems are disclosed in Cherry, U.S. Pat. No. 2,057,135, and in Urbain, U.S. Pat. No. 2,046,593. For example, FIG. 1 can be interpreted to illustrate a tongue and groove system 11 that uses clips 12 to secure panels together.

Another type of assembly and locking mechanism is understood to be disclosed in Chevaux, U.S. Pat. No. 3,946,529 where a flooring system 13 appears to be connected using a tongue and groove system arranged underneath the flooring, reference FIG. 2.

Still another assembly and locking mechanism is taught in Kajiwara, U.S. Pat. No. 5,295,341. There, it is understood that laminated boards are provided with a snap-together system such as a groove-tongue joint. As a result the laminated boards can be assembled without glue. Referring to FIG. 3, the laminated boards are provided with a locking means in the form of a groove connector 16, and a tongue connector 18. The groove connector 16 has forwardly protruding grooves 20, while the tongue 18 is provided with a pair of forwardly diverging sidewalls 22 and 24 that are separated by an elongated groove 26. The sidewalls include rear locking surfaces 28 and 36. The sidewalls can be compressed together to enable locking.

Another type of assembly and locking mechanism is the snap-together joint is suggested in Märtensson, U.S. Pat. No. 6,101,778. As shown in FIG. 4, it is understood that laminated boards are provided with a locking means comprised of a groove 6 and a tongue 7 that form a tongue-groove assembly. The groove 6 and tongue 7 may be made of water tight material and snapped together with a portion 9 fitting in a slot 4.

While the aforementioned assembly and locking mechanisms have proven useful, they have not been used with embossed-in-registration laminate systems in which embossed-in-registration decorative motifs or graphics align across joints between the individual embossed-in-registration laminates. This significantly detracts from the visual and textural impression of systems comprised of embossed-in-registration laminate boards. Therefore, a new embossed-in-registration laminate system in which the visual and textural patterns cross joints while retaining the embossed-in-registration aspects would be beneficial. Even more beneficial would be an embossed-in-registration laminate system comprised of interlocking embossed-in-registration laminate boards in which the visual and textural patterns cross joints while retaining embossed-in-registration aspects.

Further, the aforementioned flooring systems have a relatively low ability to resist wear. While not wishing to be bound by any particular theory, it is hypothesized that premature aging (wear) begins at or near the perimeter edges and/or along tongue and groove lines. The aforementioned flooring systems have a substantially even (level) surface texture such that the center and perimeter of each panel contact users (e.g., pedestrians) an equal amount. The perimeter of each panel, however, is substantially weaker than the center of the panel and therefore deteriorates first.

Accordingly, there is a need for a workable method of fabricating alternative building or finishing materials where the alternatives have the realistic look and feel of traditional products and have an increased capacity to resist premature wear.

SUMMARY OF THE INVENTION

Accordingly, the present invention is directed to embossed-in-registration flooring system that substantially obviates one or more of the problems due to limitations and disadvantages of the related art.

An advantage of the present invention provides an embossed-in-registration flooring system including individual adjacent flooring panels having embossed-in-registration decorative motifs where at least one of a surface texture and decorative motif is substantially aligned between adjacent flooring panels.

Another advantage of the present invention provides an embossed-in-registration flooring system including interlocked flooring panels having embossed-in-registration decorative motifs where at least one of a surface texture and decorative motif is substantially aligned between adjacent flooring panels such that substantially continuous embossed-in-registration patterns are formed across the interlocked flooring panels.

Another advantage of the present invention provides an embossed-in-registration flooring system may, for example, include flooring panels wherein a surface of a perimeter of each individual flooring panel may be recessed such that an upper surface of the perimeter of the flooring panels is below a portion of an upper surface of the flooring panels surrounded by the perimeter.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
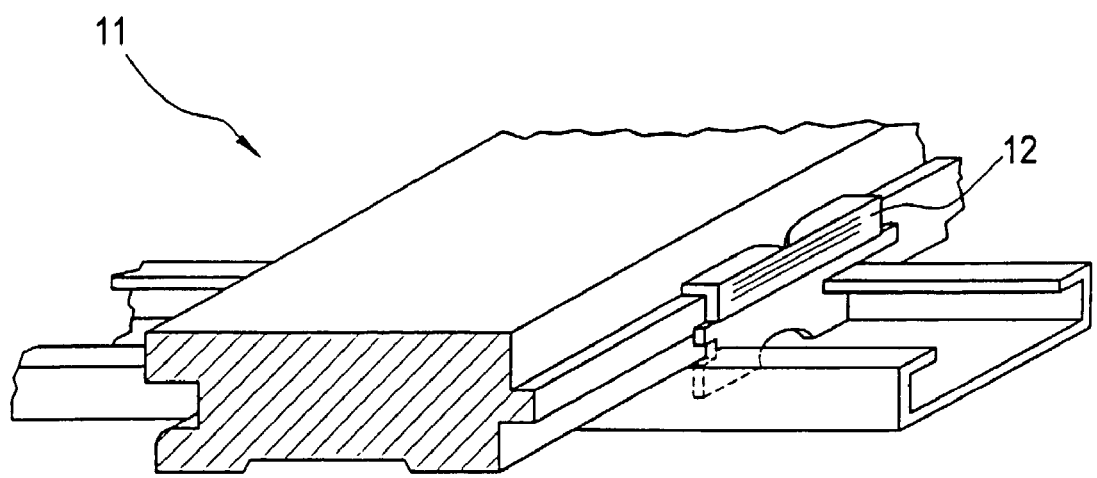
FIG. 1 illustrates a related art assembly and locking mechanism.
Figure 2:
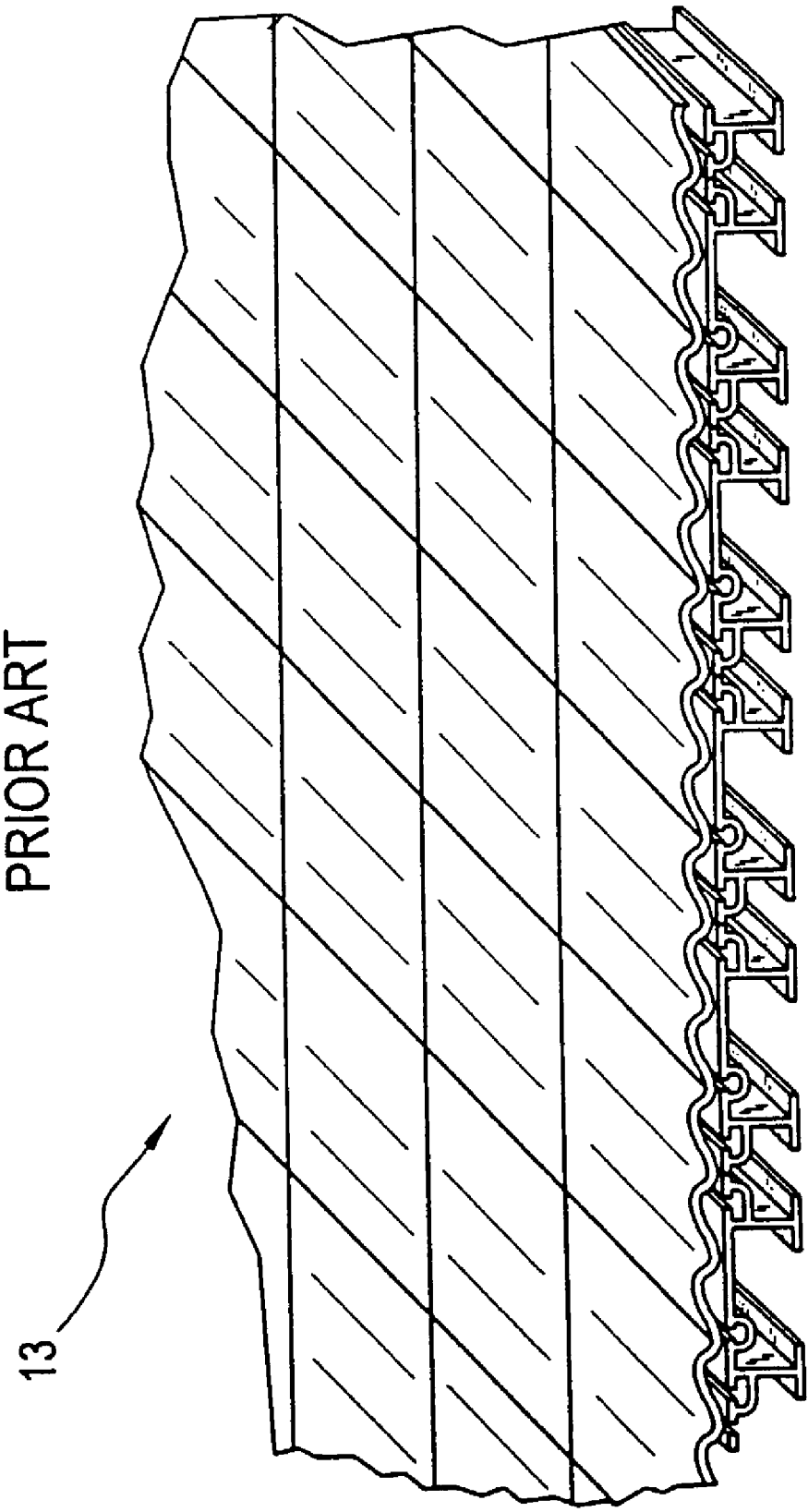
FIG. 2 illustrates another related art assembly and locking mechanism.
Figure 3:
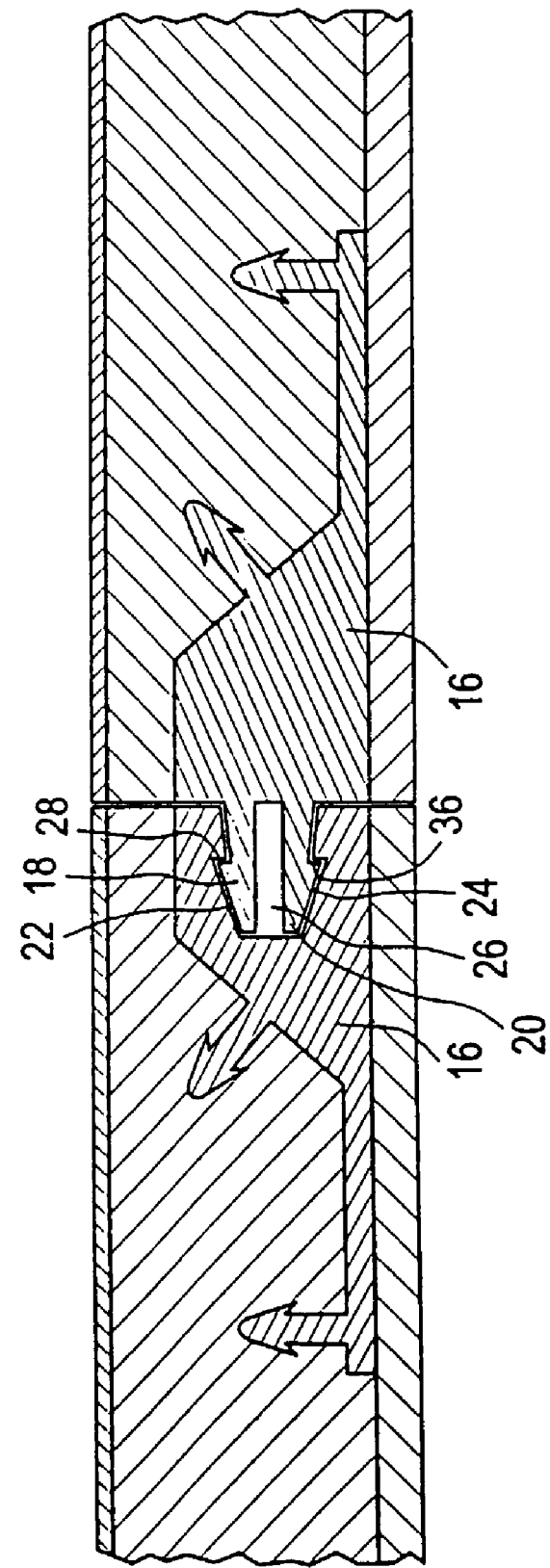
FIG. 3 illustrates yet another related art assembly and locking mechanism.
Figure 4:
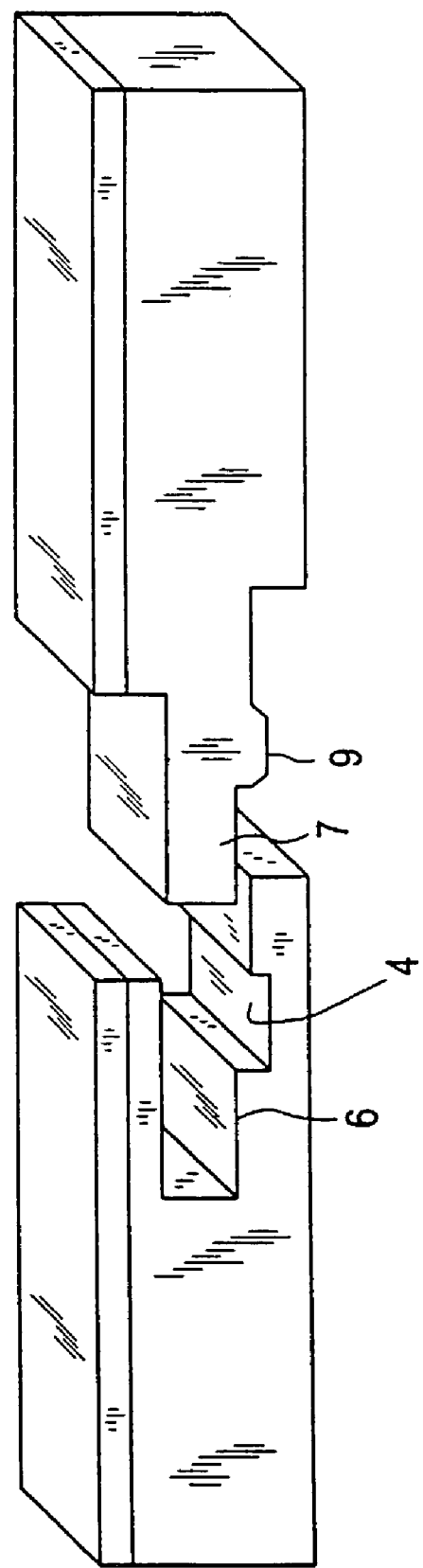
FIG. 4 illustrates still another related art assembly and locking mechanism.
Figure 5:
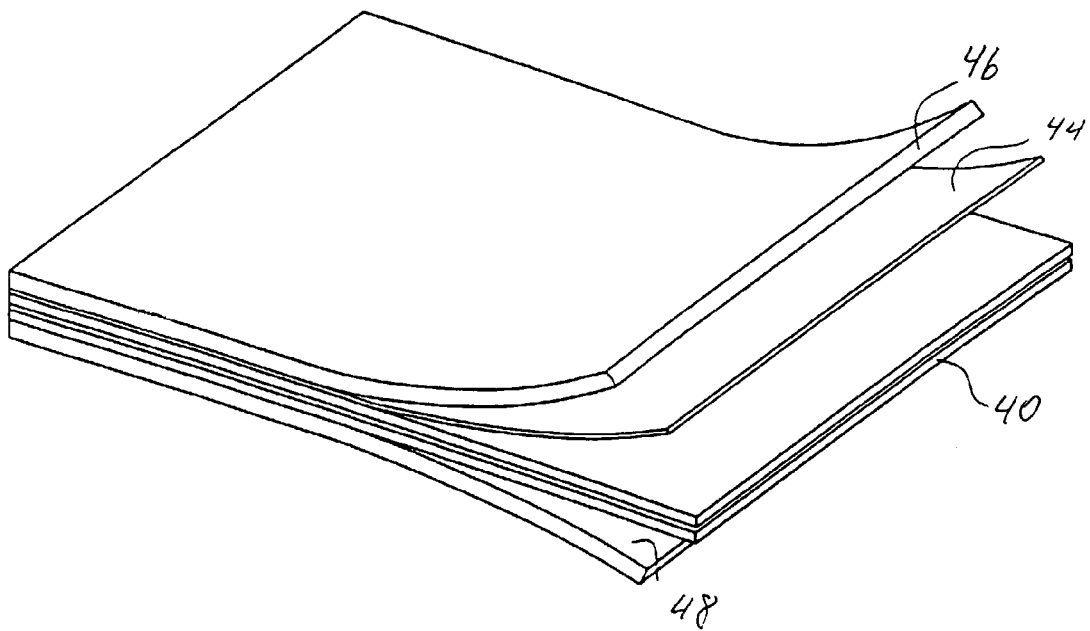
FIG. 5 illustrates a perspective view of components in an embossed-in-registration flooring panel according to the principles of the present invention.

FIG. 5 generally illustrates components of a flooring panel according to the principles of the present invention.

Referring to FIG. 5, an embossed-in-registration flooring system may, for example, include at least one flooring panel. In one aspect of the present invention each flooring panel may include a board substrate 40 made out of a substrate material (e.g., a medium or high density fiberboard, chipboard, etc.), at least one base sheet 48 (e.g., a kraft paper sheet) impregnated with predetermined resins and arranged over and/or under the board substrate 40, a decorative paper sheet 44 about 0.15 mm thick and impregnated with a polymerizable resin (e.g., phenols such as melamine) arranged over the board substrate, and at least one protective overlay sheet 46 arranged over the decorative paper sheet 44. In one aspect of the present invention, each protective overlay sheet 46 may be formed from a highly resistant paper impregnated with a melamine solution containing corundum ($Al_2O_3$), silica, etc. In another aspect of the present invention, different papers may be arranged between the decorative paper sheet 44 and the board substrate 40. In one aspect of the present invention, the at least one protective overlay sheet 46 and the base sheet 48 may be impregnated with a resin. In another aspect of the present invention the resin impregnating the at least one protective overlay sheet 46 and the base sheet 48 may be different from the melamine resin used to impregnate the decorative paper sheet 44.

In one aspect of the present invention, flooring panels within a flooring system may be fabricated from substantially the same paper, resin, etc. For example, flooring panels within a flooring system may be fabricated using paper made from substantially the same paper fibers (having, for example, substantially the same ash content, color, and orientation) on the same on the same paper making machine. Further, flooring panels within a flooring system may be fabricated using paper originating from a single, contiguous section on the manufacturing spool. All of the aforementioned paper use restrictions that may be employed in fabricating flooring panels of a flooring system ensure that impregnated papers will always have substantially the same final dimensions after they are pressed and cured. In one aspect of the present invention, the warehousing of paper used to fabricated flooring panels within a flooring system may be controlled such that the time, temperature, and humidity in which the paper is stored is maintained to facilitate consistent flooring panel dimensions.

In another aspect of the present invention, flooring panels within a flooring system may be fabricated using cellulose paste made from the same manufacturer. In yet another aspect of the present invention, flooring panels within a flooring system may be fabricated using resins made from the same manufacturer. In still another aspect of the present invention, the resins may contain powder originating from substantially the same source, have substantially the same chemical and physical qualities, and be mixed in the same reactor. Further, flooring panels within a flooring system may be fabricated using resins have a substantially constant solids content. All of the aforementioned resin use restrictions that may be employed in fabricating the flooring panels ensure that impregnated papers will always have substantially the same final dimensions after they are pressed and cured. In still another aspect of the present invention, each of the flooring panels within a flooring system may be fabricated using substantially the same impregnation process. For example, when dipping the various sheets of paper into melamine resin, the paper should experience a constant, uniform melamine load. Further, a band tension and oscillation of the impregnation machine should be precisely controlled as they influence the degree to which the various paper sheets are impregnated with the resin.

According to the principles of the present invention, the aforementioned sheets and substrates may be fabricated into an embossed-in-registration flooring system including a plurality of interlocking flooring panels. To produce such a flooring system, a press machine, such as a press machine shown in FIG. 6, may be used to mechanically emboss each flooring panel in registration with a decorative motif arranged on the decorative paper sheet 44.

Figure 6:
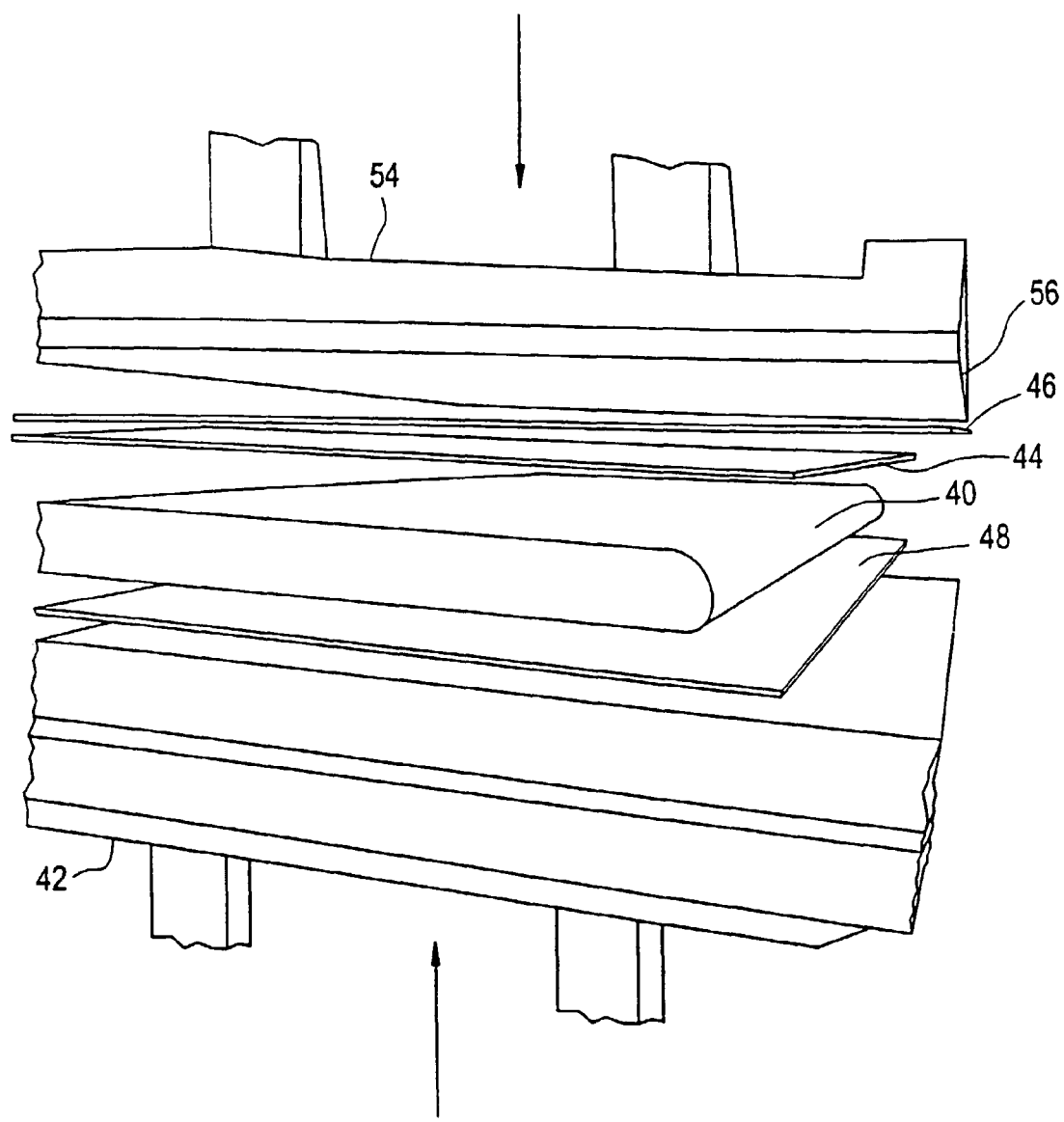
FIG. 6 illustrates a press machine capable of fabricating embossed-in-registration flooring panels in accordance with the principles of the present invention.

Referring to FIG. 6, the press machine may, for example, include a base 42, a top press 54, and an upper press plate 56. In one aspect of the present invention, the upper press plate may include an embossing pattern (e.g., a three-dimensionally textured surface). Accordingly, the embossing pattern may, for example, include elevated ridges, dots, depressions, etc., of any design capable of being aligned with a decorative motif formed on the decorative paper sheet 44.

According to the principles of the present invention, the impregnated decorative paper sheet 44 arranged on the board substrate 40 must be accurately positioned relative to the embossing pattern of the upper press plate to enable an embossed-in-registration flooring panel. In one aspect of the present invention, alignment between the embossing pattern of the press plate and the decorative motif must be ensured when the press is in a locked position and the board is under pressure. The degree of control required may vary depending on the type of decorative motif used. For example, alignment of a wood grain embossed-in-registration motif across adjacent embossed-in-registration flooring panels requires a higher degree of alignment than alignment of a wood grain embossed-in-registration motif that is not aligned with adjacent flooring panels.

Alignment between the decorative motif on the decorative paper sheet 44 and the embossing pattern on the upper press plate 56 may be achieved by removing about 2 to 3 millimeters of material around the perimeter of the board substrate 40 in a milling process thereby yielding several reference planes (e.g., board edges) and a board substrate having tightly controlled dimensions. Next, an impregnated decorative paper sheet 44 having exterior dimensions about 8 or 10 mm smaller than the board substrate 40 is arranged on the board substrate 40. In one aspect of the present invention, the impregnated decorative paper sheet 44 may be arranged on the board substrate 40 using the board edges as alignment means. In one aspect of the present invention, alignment marks may be arranged on the board substrate 40 and be alignable with alignment marks provided on the decorative paper sheet 44.

In one aspect of the present invention, the decorative paper sheet 44 may be attached to the board substrate 40 via static electricity. After they are attached, the decorative paper sheet 44 and the board substrate 40 are arranged on a carriage feeding into the press machine. The static electricity may substantially prevent the decorative paper sheet 44 from being accidentally displaced as the board substrate 40 is moved with the carriage. In one aspect of the present invention, the carriage may be stopped just before it enters into the press machine such that the decorative paper sheet 44 may be precisely arranged over the board substrate 40 using, for example, tweezers (not shown). In another aspect of the present invention, the tweezers may be used to precisely arrange the decorative paper sheet 44 over the board substrate 40 arranged on the lower press plate. In one aspect of the present invention, the decorative paper sheet 44, the at least one protective overlay sheet 46, and the optional base sheet 48 may be arranged over the board substrate 40 prior to being arranged within the press machine. After the decorative paper sheet 44 is arranged over the board substrate 40, the carriage may be moved out of the press machine. Next, an alignment system substantially aligns the decorative paper sheet 44/board substrate 40 system with the embossing pattern in the upper press plate 56. In one aspect of the present invention, the alignment system may use the board edges to substantially align the decorative motif 44 with the embossing pattern on the upper press plate 56. The press machine may be operated after the alignment is complete.

In one aspect of the present invention, after the components illustrated in FIG. 5 are arranged within the press machine and aligned with the embossing pattern, the various sheets and substrate may be pressed and cured for predetermined amount of time until the resins set, yielding an extremely hard and wear resistant flooring panel. For example, after being inserted into the press machine and aligned with the embossing pattern, the board substrate 40, decorative paper sheet 44, protective overlay sheet 46, and optional base sheet 48 may be heated at a temperature of about 160-220° C. and pressed together under a pressure of about 20-40 Kg/cm$^2$ for about 20 to 60 seconds. Accordingly, the top press 54 presses the embossing pattern of the upper press plate 56 into the decorative paper sheet 44 and board substrate 40 structure. The combination of the applied heat and pressure fuses the decorative paper sheet 44 and the board substrate 40 together. The alignment system ensures that the decorative paper sheet 44 is substantially aligned with the embossing pattern in the upper press plate 56. Accordingly, melamine resin within the various sheets may be cured and an embossed-in-registration panel may be produced.

In one aspect of the present invention, porosity within the fused piece may be minimized by slowly curing the resins (e.g., the melamine). Accordingly, as the operating temperature is reduced, the time during which the various sheets within the press machine are pressed is increased. In another aspect of the present invention, as the press plate 56 is heated to about 160-220° C. the embossing pattern included within the press plate may expand. Accordingly, the embossing pattern on the press plate 56 may be provided so as to compensate for the expansion of the pattern. Therefore, the dimensions of the embossing pattern are provided such that they substantially correspond to the design of the decorative motif when the resins within the components of FIG. 5 are cured.

According to the principles of the present invention, a mechanically embossed surface texture may be imparted to an individual flooring panel having a decorative motif. In one aspect of the present invention, the mechanically embossed surface texture may be provided in registration with the decorative motif. Accordingly, an embossed-in-registration flooring panel may be fabricated. In another aspect of the present invention, a plurality of embossed-in-registration flooring panels may be joined together to form an embossed-in-registration flooring system. In yet another aspect of the present invention, at least a portion of embossed-in-registration patterns of adjacent flooring panels may be substantially aligned with each other to form substantially contiguous embossed-in-registration patterns across adjacent flooring panels within the flooring system.

While the embossed-in-registration process described above is suitable for embossed surface textures that are less than about 0.2 mm deep, deeper surface textures may be problematic. Embossing patterns capable of imparting deep surface textures, for example, require relatively large press plate protrusions that tend to disturb the pressure homogeneity applied across the board surface. This pressure disturbance can cause distortions in the final product. In one aspect of the present invention, embossed surface textures may be formed greater than about 0.2 mm deep by hollowing out the board substrate 40 at locations where deep surface textures are desired. In one aspect of the present invention, the hollowing out process may be performed before, during, or after the perimeter of the board substrate 40 is milled as described above. In another aspect of the present invention, the board edges may be used to locate the boundaries of the hollowed out portions of the board substrate 40.

Figure 7:
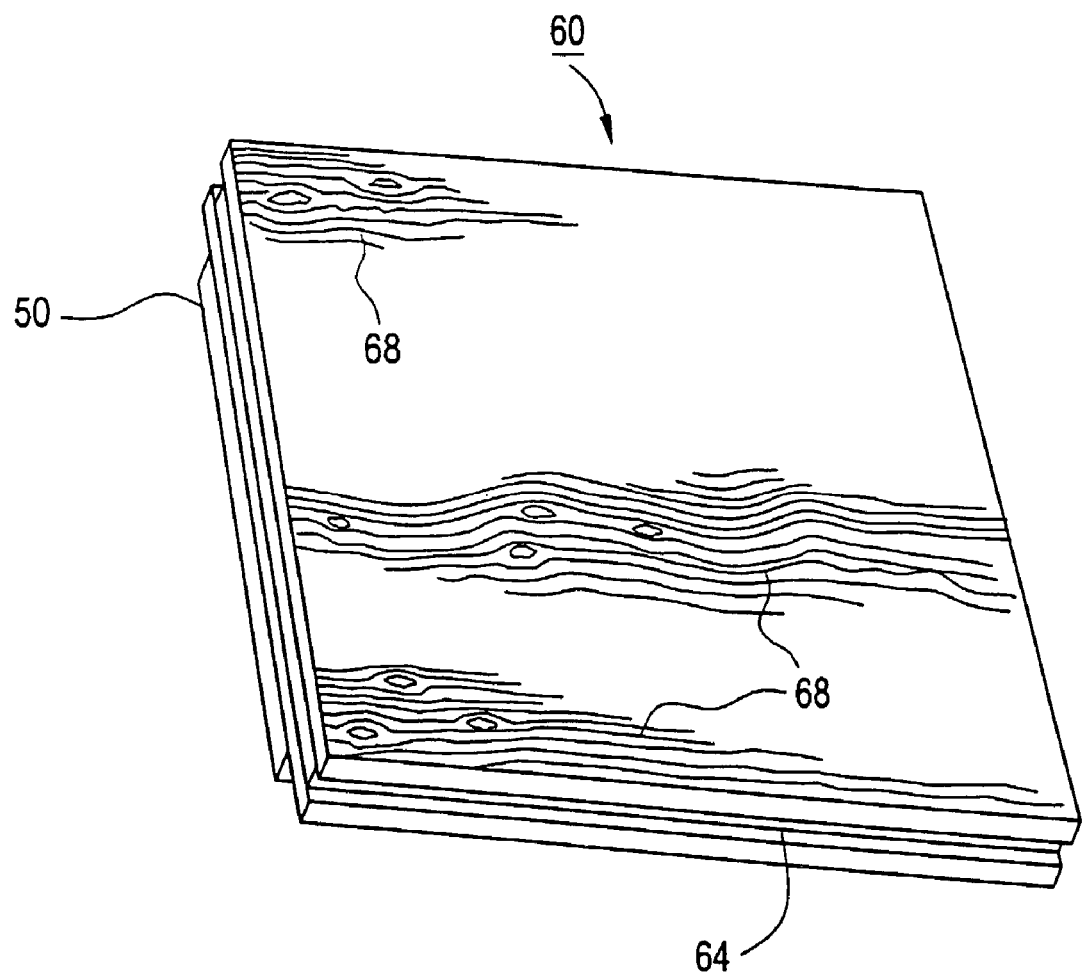
FIG. 7 illustrates an embossed-in-registration flooring panel in one aspect of the present invention.

Referring to FIG. 7, an embossed-in-registration flooring panel 60, fabricated according to the process described above may optionally include a protective padding layer 50 on one side. The mechanically embossed surface texture is registered with the decorative motif 68 of the decorative paper sheet 44. By registration, it is meant that the embossed surface texture is substantially aligned with the decorative motif of the decorative paper sheet 44. By providing an embossed-in-registration flooring panel, a realistic representation of a natural material may provided to individual flooring panels. While the decorative motif illustrated in FIG. 7 realistically represents the image and texture of a wood grain, it should be appreciated that other embossed-in-registration designs such as ceramic tiles, concrete, marble, etc., may be produced.

According to the principles of the present invention, each of the individual flooring panels may, for example, include at least one locking mechanism.

In one aspect of the present invention, locking mechanisms may be incorporated within the board substrate 40 before the embossing pattern is imparted to the surface of the board substrate 40 in registration with the decorative motif. Accordingly, locking mechanisms may be fabricated within individual board substrates 40. Next, the locking mechanisms may be used to join individual board substrates together to form a panel structure. The panel structure may then be inserted into the press 54. After the embossing pattern is imparted to the panel structure and the fused components are fused together, the panel structure is removed from the press 54. Next, embossed-in-registration flooring panels 60 within the fused panel structure are separated by unlocking the locking mechanisms. In one aspect of the present invention, cutting tools may be used to assist in the separation and to ensure the decorative motif is not damaged.

In another aspect of the present invention, the locking mechanisms may be incorporated within the board substrate 40 after the embossing pattern is imparted to the surface of the board substrate 40 in registration with the decorative motif. Accordingly, a board substrate 40 having relatively large dimensions of, for example, 4'×8', may be embossed by the press 54. Next, the resulting embossed-in-registration substrate may be cut into a plurality of individual embossed-in-registration flooring panels 60. In one aspect of the present invention, edges of the individual embossed-in-registration flooring panels 60 may have smooth edges and precise dimensions. In one aspect of the present invention, the cutting may be performed using shaping tools, milling tools, cutting tools, breaking tools, etc. In one aspect of the present invention, the board substrate may be cut by the press machine. Accordingly, the board substrate 40 may be cut into units (e.g., strips) having dimensions of, for example, 300×300 mm, 400×400 mm, 600×600 mm, 1,200×300 mm, 1,200×400 mm, etc. Next, the locking mechanisms may be incorporated within the individual embossed-in-registration flooring panels 60. In one aspect of the present invention, the locking mechanisms may be hidden beneath the surface of the flooring panels or they may be visible.

According to the principles of the present invention, the locking mechanisms may be incorporated within the individual embossed-in-registration flooring panels 60 by aligning the at least one of the board edges, alignment marks, decorative motifs, and surface textures of the flooring panel with a milling tool. By aligning the milling tool with any of the aforementioned alignable features, locking mechanisms may be milled into the sides of the board substrates 40 such that, when flooring panels 60 are joined together the at least a portion of the decorative motifs form a continuous pattern and at least a portion of the embossed-in-registration patterns form a substantially continuous surface texture across adjacent flooring panels.

Figure 8:
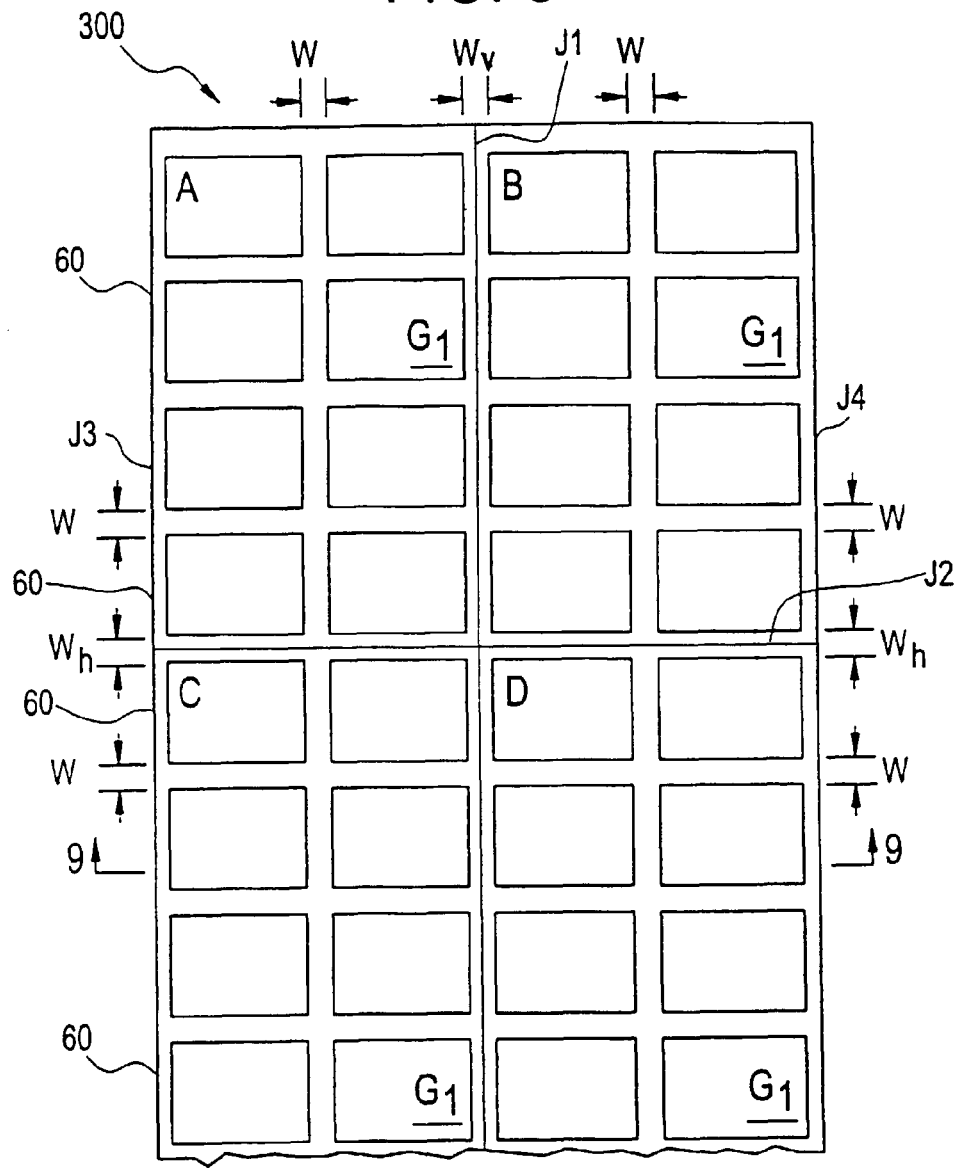
FIG. 8 illustrates a top view of a system of embossed-in-registration flooring panels in another aspect of the present invention.

According to the principles of the present invention, the embossed-in-registration flooring panel 60 may include a locking mechanism 64 (e.g., at least one of a tongue and groove locking system, a snap-together locking system, etc.) extending along all four sides of the embossed-in-registration laminate 60. For example, a snap-together locking system may be added to all four sides of the embossed-in-registration flooring panel 60 and used to connect multiple embossed-in-registration flooring panels 60 into an embossed-in-registration flooring system 300 (as shown in FIG. 8). The number and location of locking mechanisms may depend on the desired configuration of the embossed-in-registration flooring system. For example, when an embossed-in-registration flooring system abuts a corner, only two locking mechanisms are required (along the sides).

Referring to FIG. 8, the embossed-in-registration flooring panels A and B may, for example, include locking mechanisms along four sides (e.g., along joints J1, J2, J3, and J4). Embossed-in-registration flooring panels C and D may, for example, include locking mechanisms along four sides (e.g., along joints J1, J2, J3, and another joint not shown).

Embossed-in-registration flooring panels including the aforementioned locking mechanisms may be securely attached together with or without glue to form an embossed-in-registration laminate system 300. Multiple embossed-in-registration flooring panels may be joined together to obtain any desired shape for flooring, paneling, or the like. The embossed-in-registration flooring panels may be joined to each other such that at least portions of embossed-in-registration patterns of adjacent flooring panels are substantially aligned with each other and form a substantially continuous image and embossed surface texture across flooring panels within a flooring system.

Figure 9:
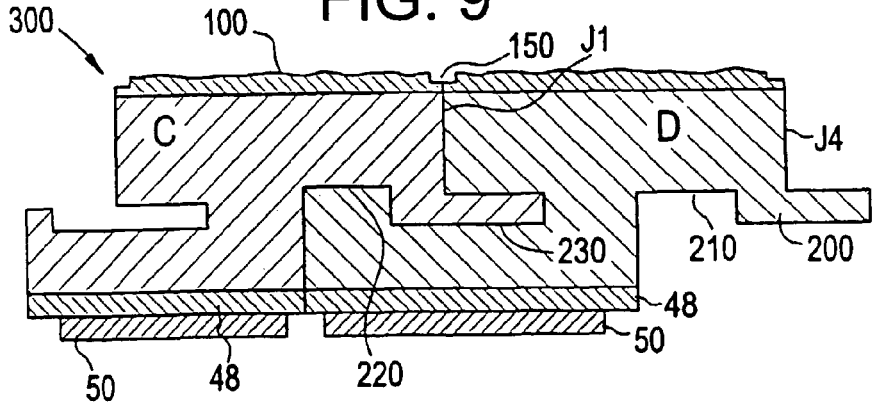
FIG. 9 illustrates a cross-sectional view along line 9-9 shown in FIG. 8.

FIGS. 8 and 9 illustrate an exemplary embossed-in-registration flooring system 300 incorporating one type of locking mechanism on each of the individual embossed-in-registration flooring panels 60. FIG. 9 illustrates an exemplary embossed-in-registration flooring system including flooring panels incorporating a snap-type tongue and groove locking mechanism. In one aspect of the present invention, the snap-type tongue and groove locking mechanism may be integrated into the sidewalls of each embossed-in-registration laminate 60 so as to ensure that embossed-in-registration patterns of adjacent flooring panels are substantially aligned with each other and substantially continuous within the flooring system.

FIG. 9 illustrates a cross sectional view of FIG. 8 taken along line 9-9. As shown, the locking mechanism may be fabricated by forming a groove 230, a tongue 200, a channel 210, and a lip 220 along the edges of the embossed-in-registration flooring panels 60. The locking mechanisms on the embossed-in-registration flooring panels 60 may be joined together by inserting the tongue 200 into the groove 230 of an adjacent embossed-in-registration flooring panel 60. Subsequently, the lip 220 is secured within channel 210, thereby joining adjacent embossed-in-registration flooring panels 60 into an embossed-in-registration flooring system 300. In one aspect of the present invention, the embossed-in-registration flooring panels 60 labeled A, B, C and D may be joined together with or without glue. It should is appreciated that other types of locking mechanisms may be incorporated within the sides of the individual embossed-in-registration flooring panels 60.

Referring back to FIG. 8, each of the embossed-in-registration flooring panels 60 may, for example, exhibit an embossed-in-registration ceramic tile motif G1. The ceramic tile motif may comprise a plurality of tiles in the shape of squares, rectangles, triangles, circles, ovals, any other shape or design that are separated by grout lines. In one aspect of the present invention, widths of grout lines Wh, Wv, and the intraboard grout width W may be substantially equal. When incorporating the snap-type tongue and groove locking mechanism into the embossed-in-registration flooring panels 60 the grout width adjacent the joints J1, J2, J3, and J4 on each embossed-in-registration laminate A, B, C, and D are approximately one-half the intraboard grout width W. For example, the vertical tile grout width (Wv) across joint J1 is made up of grout lines on embossed-in-registration laminates A, B, C and D, such that when the embossed-in-registration laminates A, B, C, and D are joined at J1 the vertical grout width (Wv) is approximately equal to (W). Accordingly, the grout width on any individual embossed-in-registration flooring panel 60 adjacent a joint is one-half of intraboard grout width (W). In another aspect of the present invention, the horizontal and vertical grout widths Wh and Wv may be controlled such they are substantially equal to the dimensions of the intraboard grout width W. It should be appreciated, however, that the dimensions of the grout widths in the embossed-in-registration flooring panels depend on the type of locking mechanism incorporated and the decorative motif exhibited.

Figure 10:
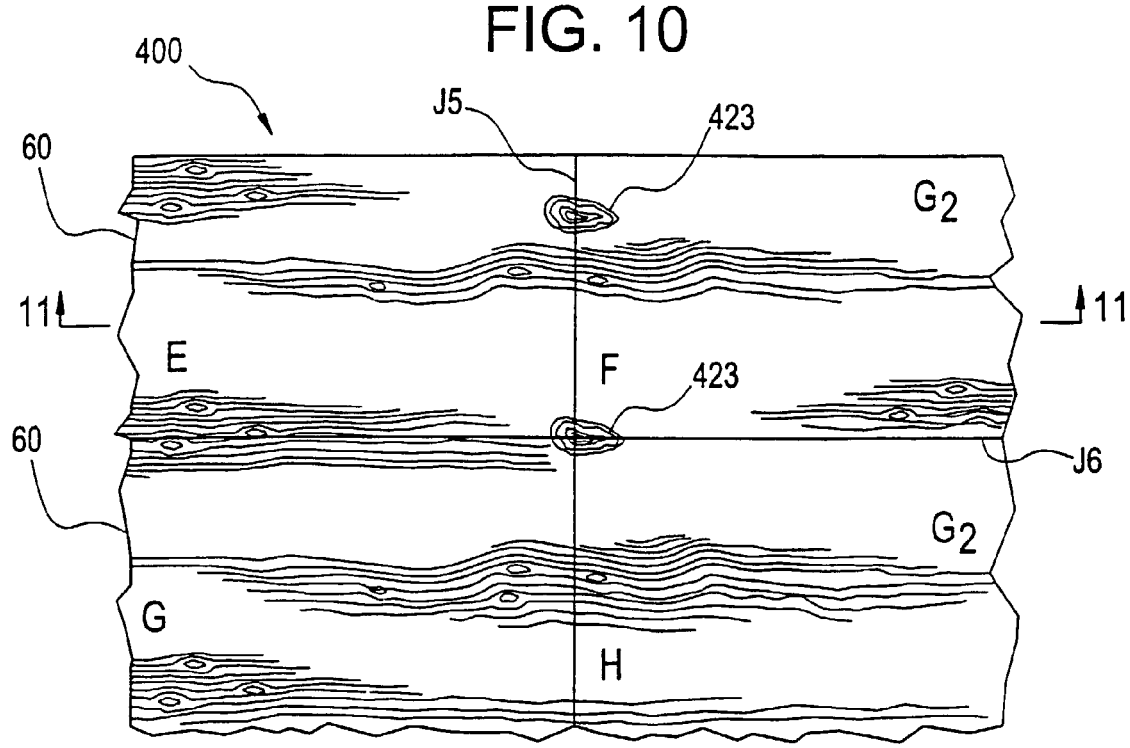
FIG. 10 illustrates a top view of a system of embossed-in-registration flooring panels in yet another aspect of the present invention.
Figure 11:
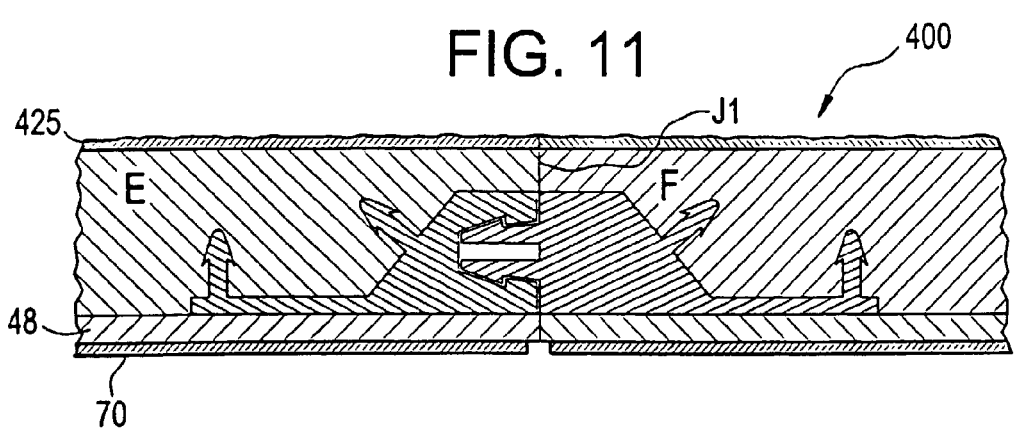
FIG. 11 illustrates a cross-sectional view along line 11-11 shown in FIG. 10.

In addition to grout lines, many other decorative motifs may be used in the embossed-in-registration flooring system of the present invention. Referring to FIGS. 10 and 11, a decorative motif exhibiting, for example, a wood grain surface G2 substantially aligned across joints J5 and J6 of adjacent flooring panels may be provided. According to the principles of the present invention, wood grain patterns generally include more elements (e.g., wood grain lines, wood knot 423, etc.) that extend to the perimeters of the flooring panels that need to be aligned than ceramic tile motifs. Accordingly, aligning the wood grain motif is generally more difficult than aligning grout line portions of the ceramic tile motifs. For example, aligning a first portion of a wood knot 423 on embossed-in-registration flooring panel E with a second portion of the wood knot 423 on embossed-in-registration flooring panel F is generally more complex than aligning grout line widths across joints of adjacent flooring panels. Accordingly, when fabricating a locking mechanism, consideration of all the graphic elements (e.g., wood grains lines and wood knots 423) must be considered to ensure a realistic embossed-in-registration flooring system 400. In one aspect of the present invention, at least one portion of the decorative motif may be used as an alignment marks ensuring consistent alignment of adjacent flooring panels.

In another aspect of the present invention, individual flooring panels within the embossed-in-registration flooring system 400 may be joined together with a snap-type mechanical system as illustrated in FIG. 11 depicting a cross sectional view of FIG. 10 along line 11-11. Again, alignment techniques used in the fabrication of the locking mechanism such that the embossed-in-registration laminate system 400 has a surface texture surface 423 that is substantially continuous across joints, J5 and J6. Optionally, the embossed-in-registration laminates 60 have a protective padding layer 70 under the base sheet 48.

Figure 12A:
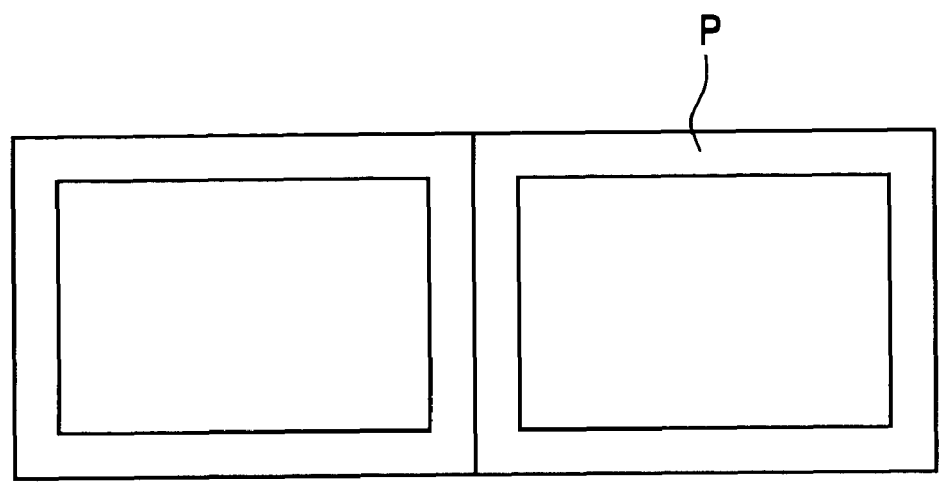
FIGS. 12A and 12B illustrate schematic views including a perimeter surface portion of a flooring panel in accordance with the principles of the present invention.
Figure 12B:
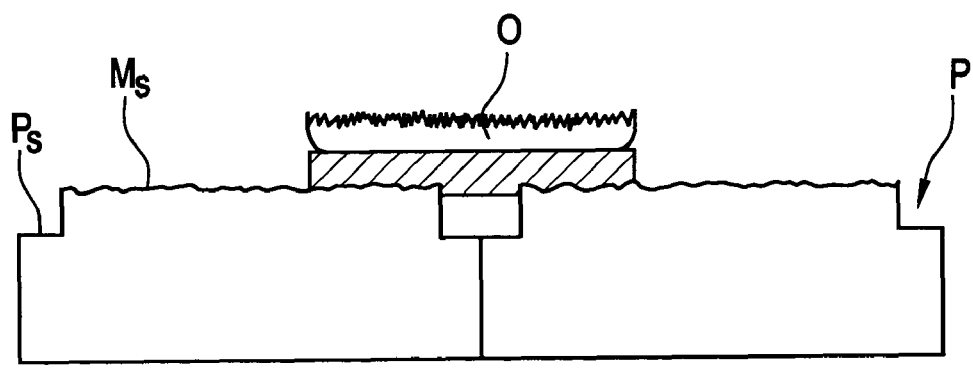

FIGS. 12A and 12B illustrate schematic views of a flooring panel in accordance with the principles of the present invention.

Referring to FIGS. 12A and 12B, an upper surface at the perimeter, P, of each embossed-in-registration flooring panel may be recessed below an upper, surface at the portions of the flooring panel surrounded by the perimeter. An object O (e.g., a users shoe, a wheel, etc.) contacting the major surface, Ms, of a flooring panel does not generally contact the surface of the perimeter, Ps, due to the perimeter's recessed surface. In one aspect of the present invention, the perimeter may include a portion of the flooring panel extending from the edge of the flooring panel approximately 3.175 mm toward the center of the flooring panel. In another aspect of the present invention, the depth to which the surface of the perimeter of the flooring panel is recessed is approximately 0.794 mm.

Accordingly, the embossed-in-registration pattern may be provided to the edges of the flooring panel and may be aligned with embossed-in-registration patterns formed on adjacent flooring panels while the edges of each individual flooring panel may be prevented from prematurely wearing.

Although it has been shown in FIGS. 8 and 10 that individual flooring panels within a flooring system are substantially the same size and shape and are joined to each other such that each side of each flooring panel is joined to only one adjacent flooring panel, it should be appreciated that individual flooring panels within a flooring system may vary in size (e.g., width and/or length) and shape (e.g., rectangular, square, triangular, hexagonal, etc.). In one aspect of the present invention, individual flooring panels may have complementary shapes capable of being assembled similar to a puzzle or mosaic. Further, one aspect of the present invention contemplates that sides of individual flooring panels may contact more than one adjacent flooring panel.

Figure 13:
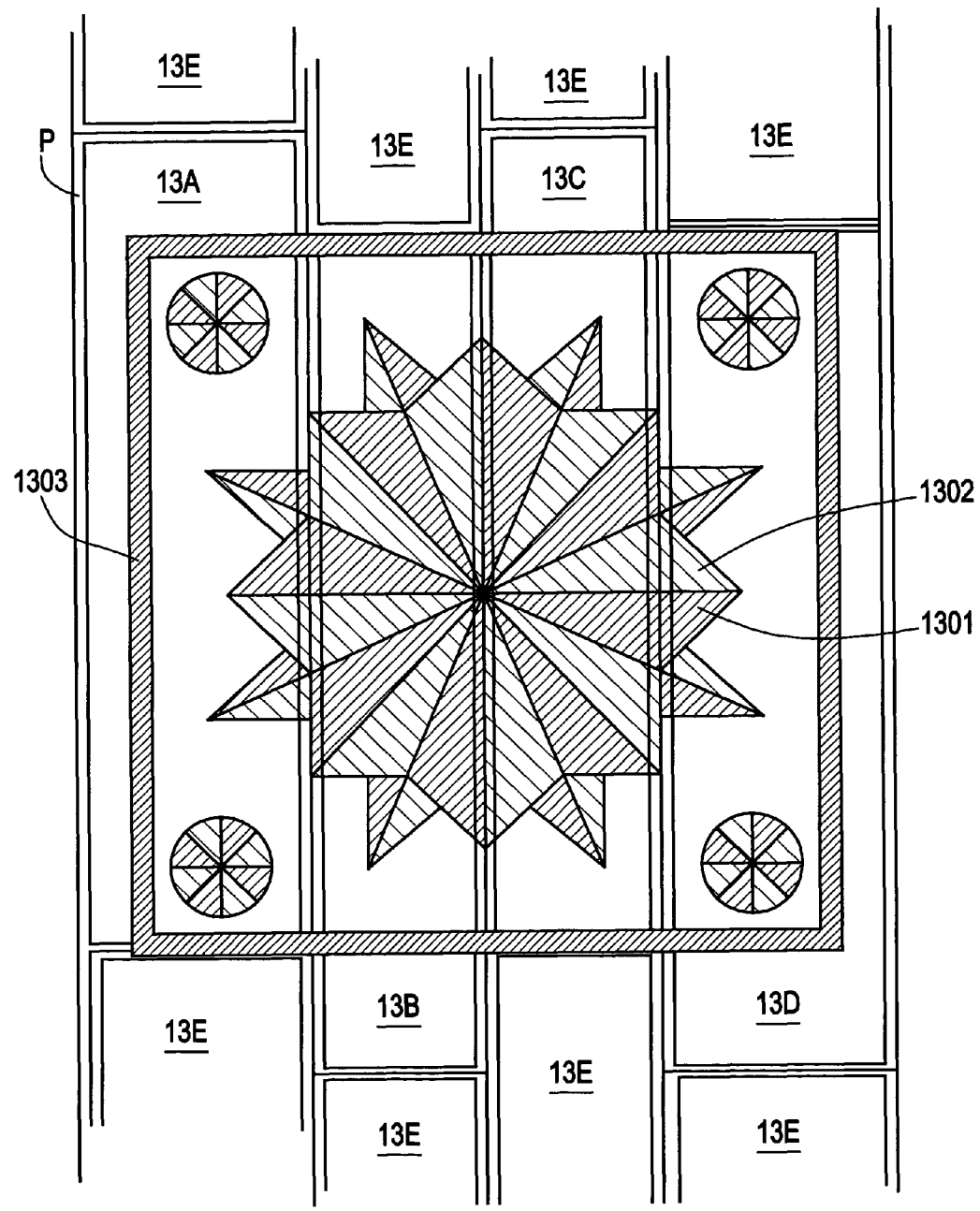
FIG. 13 illustrates a top view of a system of embossed-in-registration flooring panels in still another aspect of the present invention.

For example, referring to FIG. 13, adjacent flooring panels 13A-D having a pattern may be of the same or of differing lengths and may be arranged such that each flooring panel 13A-D is adjacent at least two additional flooring panels 13E not a part of the pattern. Further, the upper surface of the perimeter "P" of each of the flooring panels may or may not be slightly recessed compared to the major surface of each of the flooring panels (see also FIG. 12B) to prevent premature wear of each of the flooring panels. Accordingly, the motif and/or surface texture present at the recessed surface of the perimeter of each flooring panel may or may not correspond to the motif/surface texture present at the main surface of a corresponding flooring panel. Thus, a substantially continuous motif and/or surface texture may or may not be present across the surfaces of the perimeter and the interior of any individual flooring panel. Additionally, and while not explicitly shown, each darkened area 1301 may exhibit a different decorative motif than the lightened areas 1302, which may or may not be the same as the decorative motif of the flooring panel surrounding the darkened or lightened areas. Accordingly the lightened and darkened areas may have a correspondingly different embossed surface texture. Also, the flooring panels 13A-D may be aligned such that a decorative motif on one flooring panel may be aligned with a corresponding decorative motif on an adjacent flooring panel. Accordingly, decorative motifs and embossed surface textures of adjacent flooring panels may be aligned such that a decorative motive and/or an embossed-in-registration pattern is substantially continuous across adjacent flooring panels with the flooring system. Although not shown in the Figure, the flooring panels 13E may or may not have the same embossed-in-registration pattern or decorative motif as flooring panels 13A-D, or may or may be embossed-in-registration. Alignment marks or markings (not shown) can be used to self-align a decorative motif on the flooring panels. In one aspect of the present invention, the embossed in-registration pattern may be a free form or custom design. It is to be understood that substantially any embossed-in-registration pattern and any decorative motif may be realized by applying the principles of the present invention. In one aspect of the present invention, alignment of the flooring panels may be done visually upon joining them together. Accordingly, alignment of the flooring panels 13A-D may be performed using the embossed-in-registration pattern of each of the panels or a registration line 1303.

Still referring to FIG. 13, while it is illustrated that each flooring panel is substantially rectangular, the principles of the present invention allow the flooring panels within the flooring system to have other shapes and sizes (e.g., geometric, freeform, etc.) or different or similar dimensions such that the flooring panels may be assembled in a "mosaic"-type arrangement or other regular, semi-repetitious, or random arrangement of panels. The individual flooring panels within the flooring system may be cut from a board such that joints between the flooring panels of the flooring system are not visible. Further, the flooring panels within the flooring system illustrated in FIG. 13 may be joined together with or without glue. Still further, while it has been discussed that the embossed surface texture is substantially aligned with an underlying decorative motif, it is to be understood that substantially any embossed surface texture may be imparted to the flooring panels of the present invention, regardless of the underlying decorative motif. Still further, the decorative motifs and/or the embossed surface texture of one flooring panel may not be aligned or even be remotely similar in appearance and/or texture to decorative motifs and/or embossed surface textures of adjacent flooring panels.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A laminate flooring system, comprising:
   at least one laminated flooring panel, each laminated flooring panel comprising:
      a board substrate and a decorative paper sheet including at least one decorative motif pre-printed thereon, the decorative paper sheet on the board substrate;
      a plurality of side surfaces;
      a first upper surface adjacent the plurality of side surfaces; and
      a second upper surface surrounded by the first upper surface, wherein the first upper surface lower than the second upper surface and wherein at least one of the first and second upper surfaces includes an embossed surface, at least a portion of the embossed surface in registration with the decorative motif.

2. The flooring system according to claim 1, further comprising at least one locking mechanism arranged on at least one of the plurality of side surfaces.

3. The flooring system according to claim 2, wherein the at least one locking mechanism is underneath and not visible from the surface of the at least one laminated flooring panel.

4. The flooring system according to claim 1, wherein the embossed surface comprises at least one depression less than about 0.2 mm in depth.

5. The flooring system according to claim 1, wherein the first upper surface is about 0.794 mm below the second upper surface.

6. The flooring system according to claim 1, wherein the first upper surface has a width of about 3.175 mm.

7. The flooring system according to claim 1, wherein the at least one decorative motif comprises one decorative motif viewable from the first and second upper surfaces.

8. The flooring system according to claim 1, wherein the at least one decorative motif comprises a first decorative motif viewable from the first upper surface and a second decorative motif, the second decorative motif having an image different from an image of the first decorative motif, and viewable from the second upper surface.

9. The flooring system according to claim 8, wherein the first decorative motif comprises at least two decorative sub-motifs.

10. The flooring system according to claim 8, wherein the second decorative motif comprises at least two decorative sub-motifs.

11. The flooring system according to claim 1, wherein the at least one decorative motif comprises one decorative motif.

12. The flooring system according to claim 1, wherein one or more portions of the texture of the embossed surface are substantially aligned with the one or more of the graphic elements of the at least one decorative motif.

13. The flooring system according to claim 1, wherein flooring panels within the flooring system are substantially the same shape.

14. The flooring system according to claim 1, wherein at least one laminated flooring panel within the flooring system has a unique shape.

15. The flooring system according to claim 1, wherein adjacent laminated flooring panels are joined together with glue.

16. The flooring system according to claim 1, wherein adjacent laminated flooring panels are joined together without glue.

17. The flooring system according to claim 1, wherein decorative motifs of adjacent ones of flooring panels are alignable with each other such that a substantially continuous decorative motif is viewable from the upper surfaces of adjacent laminated flooring panels within the flooring system.

18. The flooring system according to claim 1, wherein embossing patterns on the embossed surfaces of adjacent ones of flooring panels are alignable with each other to form a substantially continuous embossed surface pattern viewable from across adjacent laminated flooring panels within the flooring system.

19. The flooring system according to claim 1, wherein at least one of the plurality of side surfaces of at least one flooring panel contacts more than one adjacent laminated flooring panel.

20. The flooring system according to claim 1, wherein at least one laminated flooring panel visually depicts wood.

21. The flooring system according to claim 1, wherein at least one laminated flooring panel visually depicts ceramic.

22. The flooring system according to claim 1, wherein at least one laminated flooring panel visually depicts stone.

23. The flooring system according to claim 1, wherein the decorative motif on at least the second upper surface visually depicts multiple ceramic tiles.

24. The flooring system according to claim 23, wherein the second upper surface varies in height in registration with the decorative motif.

25. The flooring system of claim 1, wherein the continuous first upper surface extends along at least a majority of the perimeter of the flooring panel.

* * * * *